United States Patent [19]

Suzuki et al.

[11] Patent Number: 4,831,712

[45] Date of Patent: May 23, 1989

[54] METHOD FOR MANUFACTURING SIAMESE-TYPE CYLINDER BLOCK AND APPARATUS FOR CASTING BLANK FOR SUCH CYLINDER BLOCK

[75] Inventors: Tetsuya Suzuki, Ooi; Masuo Ebisawa, Kawagoe; Kiyoshi Shibata, Hidaka; Shigeo Kaiho, Oomiya; Akio Kawase, Ageo; Shuji Kobayashi, Kawagoe; Yoshikazu Kanzawa, Tsurugashima, all of Japan

[73] Assignee: Honda Giken Kogyo Kabushiki Kaisha, Tokyo, Japan

[21] Appl. No.: 177,770

[22] Filed: Apr. 5, 1988

Related U.S. Application Data

[63] Continuation of Ser. No. 54,402, May 26, 1987, abandoned, which is a continuation of Ser. No. 795,423, Nov. 6, 1985, abandoned.

[30] Foreign Application Priority Data

| | | | |
|---|---|---|---|
| Nov. 9, 1984 | [JP] | Japan | 59-236235 |
| Nov. 9, 1984 | [JP] | Japan | 59-236236 |
| Nov. 9, 1984 | [JP] | Japan | 59-236237 |
| Nov. 12, 1984 | [JP] | Japan | 59-238099 |

[51] Int. Cl.[4] .............................................. B23P 17/00

[52] U.S. Cl. .................................. 29/527.6; 164/112; 164/334

[58] Field of Search ...................... 164/76.1, 100, 111, 164/112, 332, 333, 334; 72/393; 29/527.6

[56] References Cited

U.S. PATENT DOCUMENTS

| | | | |
|---|---|---|---|
| 3,098,270 | 7/1963 | Bauer | 164/112 |
| 3,382,699 | 5/1968 | Seeman | 72/393 |
| 3,654,797 | 4/1972 | Skalsey | 72/393 |

FOREIGN PATENT DOCUMENTS

| | | | |
|---|---|---|---|
| 729119 | 12/1942 | Fed. Rep. of Germany | 164/111 |
| 75280 | 5/1982 | Japan | 164/111 |

*Primary Examiner*—Lowell A. Larson
*Attorney, Agent, or Firm*—Roberts, Spiecens & Cohen

[57] ABSTRACT

A method for manufacturing a siamese-type cylinder block, which comprises the steps of pouring under pressure a molten metal of aluminum alloy into a siamese-type cylinder barrel molding cavity with an expansion force applied to the sleeve placed in such cavity, and then removing the expansion force after the completion of solidification of the molten metal to cast a cylinder block blank, and subjecting the resulting blank to a working operation for forming the peripheral inner surface of the sleeve into a true circle.

33 Claims, 16 Drawing Sheets

METHOD FOR MANUFACTURING SIAMESE-TYPE CYLINDER BLOCK AND APPARATUS FOR CASTING BLANK FOR SUCH CYLINDER BLOCK

CROSS RELATED APPLICATIONS

This application is a continuation of Ser. No. 054,402 filed May 26, 1987, now abandoned, which in turn is a continuation of Ser. No. 795,423 filed Nov. 6, 1985 now abandoned.

BACKGROUND OF THE INVENTION

1. Field of the Invention

The present invention relates to a method for manufacturing a siamese-type cylinder block and more particulary, to a method for manufacturing such a cylinder block in which a sleeve made of cst iron is incorporated in each cylinder barrel of a siamese-type cylinder barrel made of an aluminum alloy and consisting of a plurality of cylinder barrels connected in series.

The invention also relates to apparatus for casting a blank for such cylinder block.

2. Description of the Prior Art

In the prior art, a siamese-type cylinder block has been made by placing each sleeve in a siamese-type cylinder barrel molding cavity in a mold to cast a cylinder block blank in a die cast process and then, subjecting the inner peripheral surface of each sleeve to a working operation to form it into a true circle.

In this conventional process, however, each sleeve becomes deformed and has a substantially oval configuration in a section with the lengthwise axis perpendicular to the axis of the cylinder barrels because the opposed peripheral walls of the adjacent sleeves are intensely subjected to the pressure of the molten metal during introduction thereof.

In this case, the configuration in section of each cylinder barrel after shrinkage thereof upon solidication of the molten aluminum alloy is substantially oval with the lengthwise axis parallel to the direction of the aligned cylinder barrels and hence, each sleeve is subjected to the shrinkage force of the aluminum alloy and is deformed to follow the configuration in section of each cylinder barrel upon its shrinkage, and the deformed sleeve is changed in configuration at the introduction of the moltern metal to a slight extent.

This results in an oval configuration in section of each sleeve and barrel with their lengthwise axes offset approximately 90° from each other. Hence, the casting stress remaining in each sleeve is nonuniform around its inner peripheral surface. When the sleeve in such a state is subjected to machining to form its inner peripheral surface into a true circle for assembly in an engine, this operation causes the sleeve to be thermally expanded nonuniformly around its circumference. For this reason, a clearance may be produced between a piston ring and the sleeve, resulting in an increased amount of blow-by gas and a useless consumption of oil.

In addition, in the conventional process, the sleeve has been cast in each cylinder barrel. At the outer peripheral surface of each sleeve, annular or spiral slip-off preventing grooves are formed at a predetermined pitch during the casting of the sleeve in the mold to extend in the circumferential direction over a predetermined length from the end of the sleeve at which a cylinder head is secured. The slip-off preventing grooves are generally U-shaped in cross section.

However, the use of the sleeve as cast prevents close adhesion because of microporosity of the outer peripheral surface of such sleeve and thus, a very small clearance may be produced between the sleeve and the cylinder barrel. If the slip-off preventing grooves is of U-shaped in cross section, then a gas, such as air can enter at the corners between the inner side and bottom surface of the groove during casting and be confined therein by the molten metal. This also causes a very small clearance to be produced between the sleeve and the cylinder barrel as described above. In a siamese-type cylinder block, the adjacent sleeves are very close to each other, and between these sleeves there is generally no water-jacket. Therefore, the heat at the portions of both the sleeves opposed to each other may be transferred in the shortest path to a water jacket through the barrel located between these sleeves. However, if a very small clearance, as described above, is produced around the outer periphery at those portions of both opposed sleeves, such heat transfer path is disconnected so that release of heat from the sleeve is not effected uniformly around its circumference. Thus, the efficiency in release of heat from the sleeve is reduced.

The shaping of individual slip-off preventing grooves by the mold results in a wide variation in depth of the grooves and in an unevenness in thickness of the sleeve at the slip-off preventing grooves and the land portions between the adjacent grooves.

In such a cylinder block, the amount of sleeve expansion is nonuniform around the circumference of the sleeve and hence, the same problems may arise as described above.

SUMMARY OF THE INVENTION

It is an object of the present invention to provide a process for manufacturing a siamese-type cylinder block in which the amount of thermal expansion of each sleeve is uniform around the circumference of the sleeve during operation of the engine.

It is another object of the present invention to provide an apparatus for casting a cylinder block blank to produce a siamese-type cylinder block in which the amount of thermal expansion of each sleeve is uniform around the circumference of the sleeve during operation of engine.

To accomplish the above objects, according to the present invention, there is provided a method for manufacturing a siamese-type cylinder block, which comprises the steps of introducing a molten metal of aluminum alloy under pressure into a siamese-type cylinder barrel molding cavity in a mold with an expansion force applied to each sleeve placed in such cavity and then, removing the exspansion force after the completion of solidification of the molten metal whereby a cylinder block blank is cast, and machining the blank to form the inner peripheral surface of each sleeve into a true circle.

According to the present invention, there is also provided a method for manufacturing a siamese-type cylinder block, which comprises steps of introducing a molten metal of aluminum alloy under pressure into a siamese-type cylinder barrel molding cavity in a mold with an expansion force applied to each sleeve placed in such cavity and heated to a temperature of 150° to 700° C. and then, removing the expansion force after the completion of solidification of the molten metal to form a cast a cylinder block blank with incorporated sleeves, and machining the inner peripheral surface of each sleeve into a true circle.

Further, according to the present invention, to the thickness of each sleeve is 50% or less than the smallest thickness of the cylinder barrel between adjacent sleeves.

Yet further, according to the present invention, there is provided an apparatus for casting a blank of siamese-type cylinder block, which comprises a mold having a siamese-type cylinder barrel molding cavity, an expanding mechanism at a location in the cavity at which each sleeve is disposed for applying an expansion force to the sleeve, and a pair of sealing members adapted to be fitted respectively on the inner peripheral surfaces at the opposite openings of each sleeve.

As described above, molten metal is introduced under pressure into the siamese-type cylinder barrel molding cavity in the mold with an expansion force applied to each sleeve placed in such cavity and therefore, each sleeve is prevented from being deformed by the pressure of the molten metal. The expansion force is then removed after the completion of solidification of the molten metal, so that each sleeve can deform to follow the configuration in section of each cylinder barrel during its shrinkage. Thereupon, the casting stress remaining in each sleeve is substantially uniform around the circumference of the sleeve, leading to a good degree of balance in such stress.

Thereafter, the inner peripheral surface of each sleeve is machined to a true circle and hence, the amount of thermal expansion of each sleeve during operation of the engine is substantially uniform around the circumference of engine is substantially uniform around the circumference of the sleeve. This effectively suppresses the creation of a clearance between a piston ring and the sleeve, thus making it possible to overcome the problems of an increase in amount of blow-by gas and a useless consumption of oil.

In addition, since each sleeve can not be deformed by the injection pressure of the molten metal, it is possible to place the adjacent sleeve extremely close to each other. The enables the cylinder block and thus the whole engine to be small-sized and lightweight.

Since each sleeve is previously heated to 150°-700° C., it is readily heated by the molten metal to substantially the same temperature of the latter so that its rigidity is reduced, and upon the removal of the expansion force after the completion of solidification of the molten metal, the sleeve thus reduced in rigidity can be easily deformed to follow the configuration in section of each cylinder barrel during its shrinkage.

Further, the fact that the inner peripheral surface of each sleeve is machined into a true circle to make the thickness of each sleeve 50% or less than the smallest thickness of the cylinder barrel between adjacent sleeves also enables each sleeve to have a reduced rigidity and to be easily deformed to follow the configuration in section of each cylinder barrel during its shrinkage.

The removal of the casting surface form the entire outer periphery of the sleeve results in a good adhesion between the sleeve and the molten metal and consequently, no clearance with be produced between the sleeve and the cylinder barrel. Therefore, the release of heat from the sleeve will be effected uniformly over the circumference of the sleeve. In addition, the slip-off preventing groove causes the sleeve to be enlarged in surface area and hence, the efficiency in release of heat from the sleeve is also improved conjointly with the good adhesion. Further, the thickness of the sleeve becomes uniform at the slip-off preventing groove and the land portion.

Still further, because the slip-off preventing groove is shaped into a conjugate arc in cross section, a gas, such as air, can not be confined in the slip-off preventing groove by the molten metal, thereby making it possible to prevent any clearance from being produced between the sleeve and the cylinder barrel.

Finally, with the aforesaid apparatus, it is possible to easily cast a blank of siamese-type cylinder block in which the casting stress remaining in each sleeve is substantially uniform around the circumference of the sleeve.

BRIEF DESCRIPTION OF THE DRAWINGS

The above and other objects, features and advantages of the invention will become apparent from reading the following description taken in conjunction with the accompanying drawings.

FIG. 1 is a perspective view of the apparatus from above;

FIG. 2 is a sectional view taken along line II—II in FIG. 1;

FIG. 3 is a perspective view of the apparatus from below;

FIG. 4 is a sectional view taken along line IV—IV in FIG. 2;

DETAILED DESCRIPTION OF PREFERRED EMBODIMENTS

Figure 1:
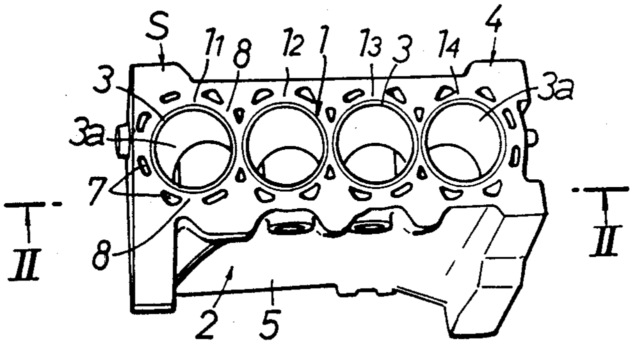
FIGS. 1 to 4 illustrate an in-line siamese-type cylinder block provided according to the present invention.
Figure 2:
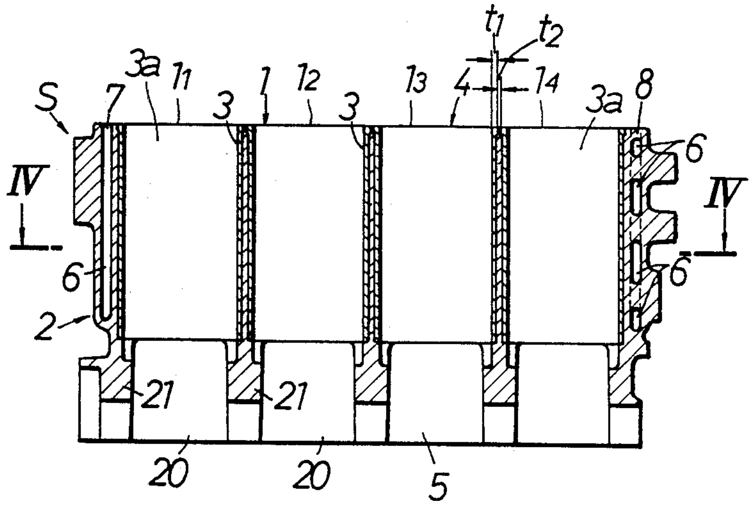

Referring to FIGS. 1 to 4, there is shown an in-line siamese-type cylinder block S obtained according to the present invention. The cylinder block S is comprised of a cast cylinder block body 2 made of an aluminum alloy and a plurality of sleeves 3 made of a cast iron incorporated in the body 2, The cylinder block body 2 includes a portion constituted as a siamese-type cylinder barrel 1 consisting of a plurality of, e.g., four (in the illustrated embodiment) cylinder barrels $1_1$ to $1_4$ each defining a respective cylinder bore.

The sleeves 3 are incorporated in each of the cylinder barrels $1_1$ to $1_4$ when the cylinder block below is cast to define respective cylinder 3a.

A water jacket 6 is defined between the siamese-type cylinder barrel 1 and the outer wall region 4, so that he entire periphery of the siamese-type cylinder barrel 1 faces the water jacket 6. At the upper end of the block at which the cylinder head is attached, the siamese-type cylinder barrel 1 is connected to the outer wall region 4 by a plurality of reinforcing deck portions 8, and the space between adjacent reinforcing deck portions 8 functions as a communication port 7 into the cylinder head. Thereupon, the cylinder block S is constituted as a closed deck type.

Figure 5:
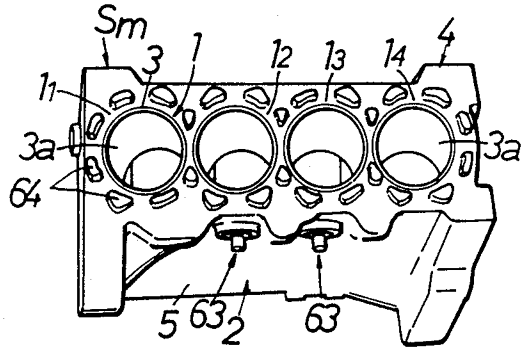
FIG. 5 is a perspective view of a siamese-type cylinder block blank produced in a casting process according to the present invention, viewed from above.
Figure 3:
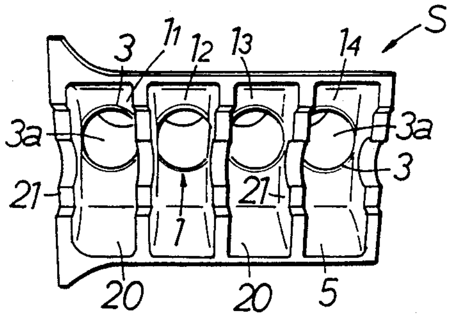
Figure 4:
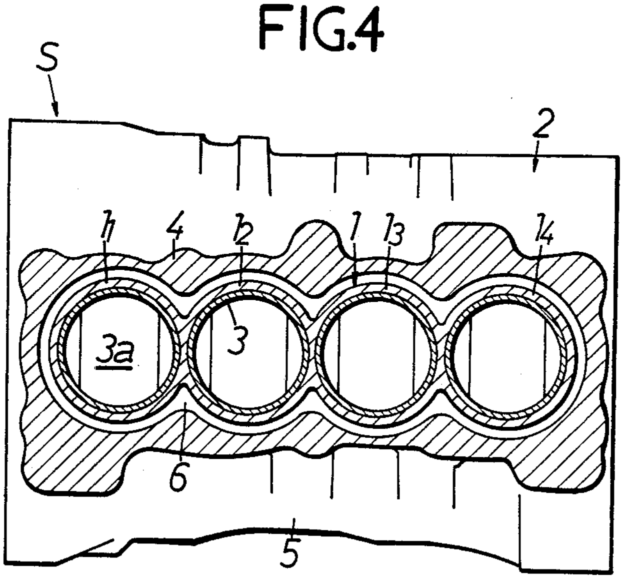

Referring to FIGS. 6 to 10, therein is seen an apparatus for casting a cylinder block blank Sm shown in FIG. 5, which apparatus comprises a mold M. The mold M is constituted of a liftable upper die 9, first and second laterally split side dies $10_1$ and $10_2$ (see FIGS. 6 and 7) disposed under the upper die 9, and a lower die 11 on which both the side dies $10_1$ and $10_2$ are slidably disposed.

Figure 7:
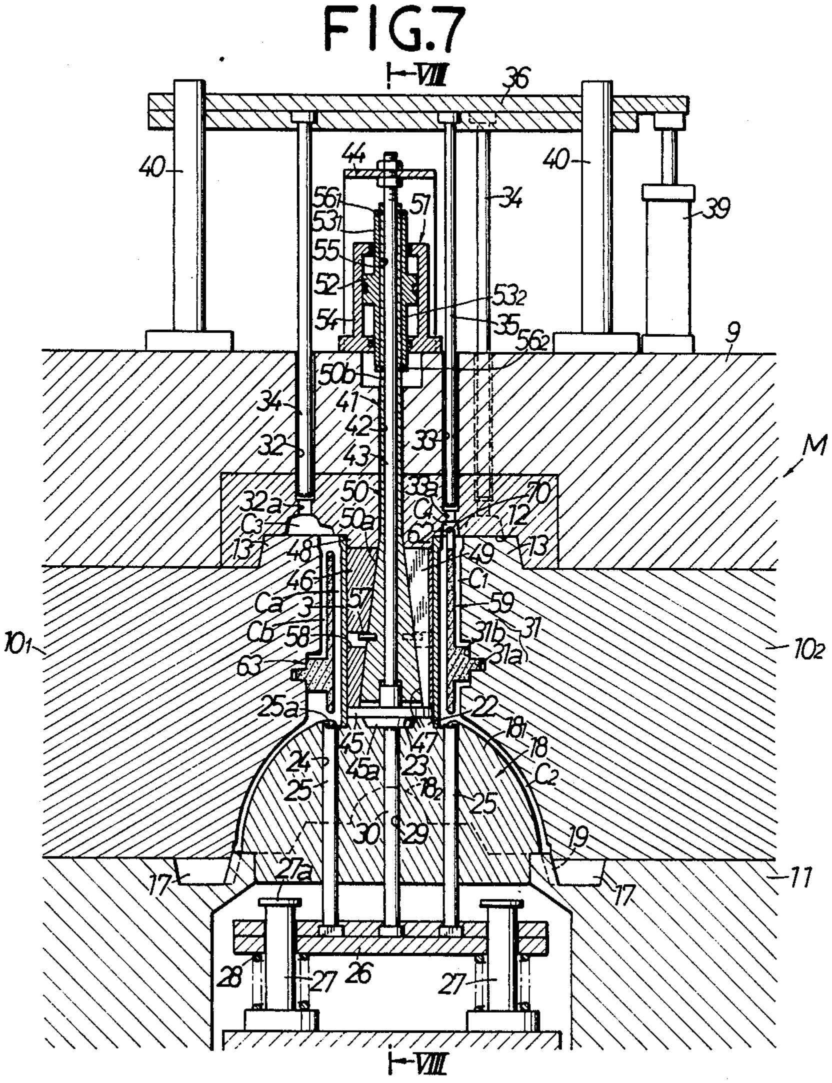
FIG. 7 is a front view in vertical section of the casting apparatus with the mold closed.

A clamping recess 12 is formed on the underside of the upper die 9 to define the upper surface of a first cavity C1, and a clamping projection 13 adapted to be fitted in the recess 12 is provided on each of the side dies $10_1$ and $10_2$. The first cavity C1 consists of a siamese-type cylinder barrel molding cavity Ca defined between a water-jacket molding sand core 59 and an expansion shell 46, and an outer wall molding cavity Cb defined between the sand core 59 and both the side dies $10_1$ and $10_2$, in the closed condition as shown in FIG. 7.

Figure 8:
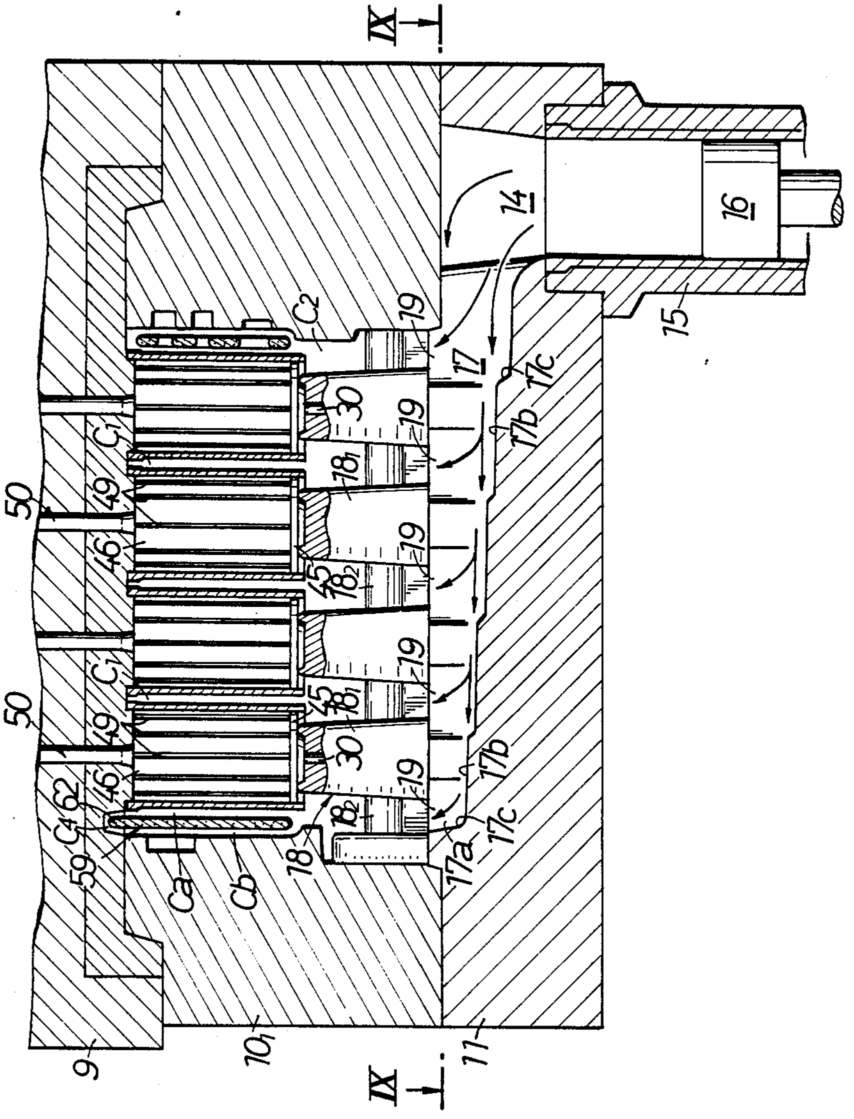
FIG. 8 is a sectional view taken along line VIII—VIII in FIG. 7.
Figure 9:
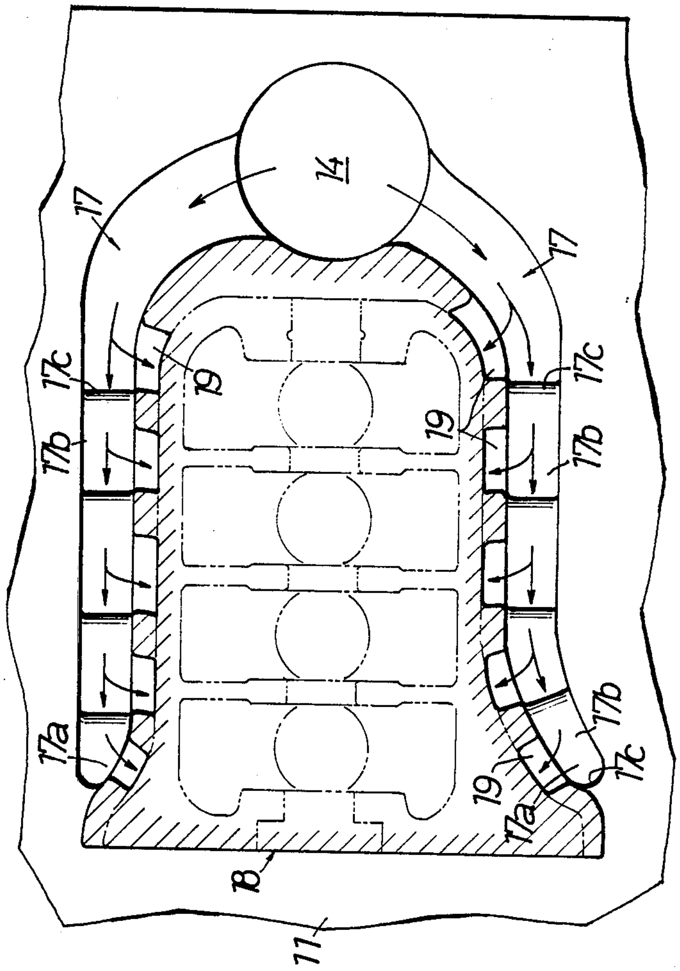
FIG. 9 is a sectional view taken along line IX—IX in FIG. 8.

As shown in FIGS. 8 and 9, the lower die 11 includes a basin 14 for receiving a molten metal of aluminum alloy from a furnace (not shown), an injecting cylinder 15 communicating with the basin 14, a plunger 16 slidably fitted in the cylinder 15, and a pair of runners 17 bifurcated from the basin 14 to extend in the direction of the cylinder barrels. The lower die 11 also has a molding block 18 projecting upwardly between both of the runners 17, and the molding block 18 defines a second cavity C2 for molding crankcase 5 in cooperation with both the side dies $10_1$ and $10_2$. The cavity C2 is in communication at its upper end with the first cavity C1 and at its lower end with both the runners 17 through a plurality of gates 19.

The molding block 18 is comprised of four first taller semicolumnar molding portions $18_1$ formed at predetermined intervals, and second protruded molding portions $18_2$ located between the adjacent first molding portions $18_1$ and outside both of the outermost first molding portions $18_1$. Each first molding position $18_1$ is used for molding a space 20 (see FIGS. 2 and 3) in which a crankpin and crankarm can rotate, and each second molding portion $18_2$ is employed to mold a crank journal bearing holder *2a* (see FIGS. 2 and 3). Each gate 19 corresponds to each of the second molding portions $18_2$ and is designed to permit the introduction of the molten metal in the larger volume portion of the second cavity C2 in an early stage.

Both the runners 17 have bottom surfaces with several ascending steps so that the sectional area decreases stepwise from the basin 14 toward runner extensions *17a*. Each riser portion *17c* connected to each stepped portion *17b* is angularly disposed to smoothly guide the molten metal into each of the gates 19.

With the sectional area of the runner 17 decreasing stepwise in this manner, a larger amount of molten metal can be introduced, at the portion of larger sectional area, into the second cavity through the gate 19 at a higher speed, so that the molten metal level in the cavity C2 is raised substantially uniformly over the entire length of the cavity C2 from the lower ends at the opposite sides thereof. Therefore, the molten metal will not produce any turbulent flow and thus, a gas, such as air, can be prevented from being included into the molten metal whereby the generation of mold cavities is avoided. In addition, the introduction of molten metal is effectively conducted, leading to an improved casting efficiency.

Figure 6:
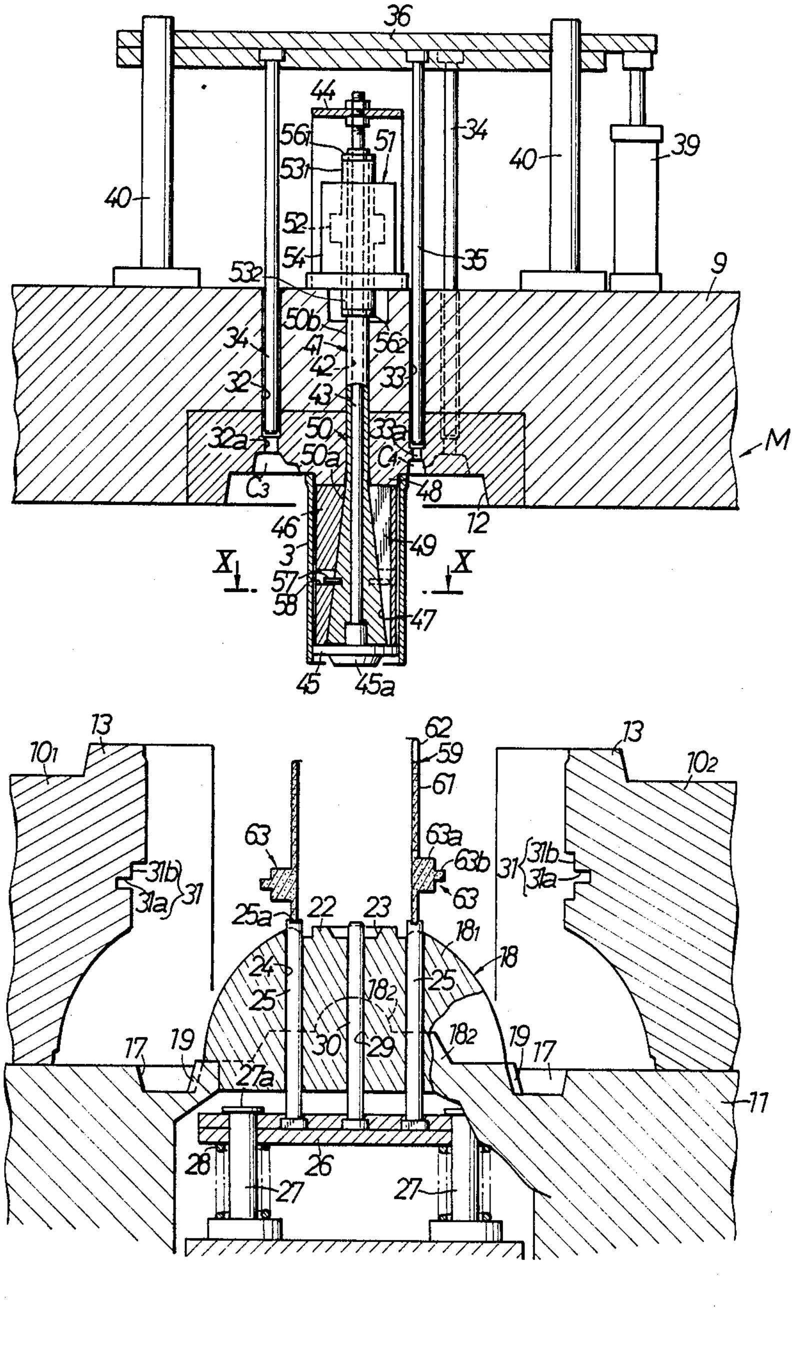
FIG. 6 is a front view in vertical section of the casting apparatus with the mold open.

As shown in FIGS. 6 and 7, a locating projection 22 is provided on the top of each the first molding portions $18_1$ and adapted to be fitted in the circumferential surface of the sleeve 3 of cast iron, and a recess 23 is defined at the central portion of the locating projection 22. A through hole 24 is made in each of two first molding portions $18_1$ located on the opposite sides to penetrate into the first molding portion $18_1$ on each of the opposite sides of the locating projection 22. A pair of placing pins 25 are slidably fitted in the through holes 24, respectively, and are used to temporarily position the water-jacket molding sand core 59. The lower ends of the placing pins 25 are fixed on a mounting plate 26 disposed below the molding block 18. Two support rods 27 are inserted through the mounting plate 26, and a coil spring 28 is provided in compression between the lower portion of each of the support rods 27 and the lower surface of the mounting plate 26. During opening of the mold, the mounting plate 26 is subjected to the resilient force of each of the coil springs 28 to move upwardly until it abuts against a stopper *27a* on the upper end of each of the support rods 27. This causes the upper end of each of the placing pins 25 to protrude from the top surface of the first molding portion $18_1$. A recess *25a* is rounded in the upper end of each of the placing pins 25 and is adapted to be engaged by the lower edge of the sand core.

A through hole 29 is provided between the two first molding portions $18_1$ midway between the through holes 24, and an operating pin 30 is slidably fitted in the through hole 29. The lower end of the operating pin 30 is fixed to the mounting plate 26. During opening of the mold, the upper end of the operating pin 30 protrudes into the recess 23, and during closing of the mold, pin 30 is pushed down by an expanding mechanism 41, thereby retracting both the pins 25 from the top surfaces of the first molding portions $\mathbf{18_1}$.

A core bedding recess 31 for the sane core 59 is provided in the central portions of walls of the first and second side dies $\mathbf{10_1}$ and $\mathbf{10_2}$. Each of the core bedding recesses 31 consists of an engaging bore 31a in which the sand core is positioned, and a clamp surface 31b formed around the outer periphery of the opening of the engaging bore 31*a* for clamping the sand core.

In the clamping recess 12 of the upper die 9 are a plurality of third cavities C3 opened into the first cavity C1 to permit the overflow of molten metal and a plurality of fourth cavities C4 for shaping the communication holes 7. The upper die 9 also has gas vent holes 32 and 33 therein which communicate with each of the third cavities C3 and each of the fourth cavities C4, respectively.

Closing pins 34 and 35 are inserted into the gas vent holes 32 and 33, respectively, and are fixed at their upper ends to a mounting plate 36 disposed above the upper die 9.

The gas vent holes 32 and 33 have smaller diameter portions 32*a* and 33*a*, respectively, which extend upwardly a predetermined length from the respective ends, of the gas vent holes 32 and 33, communicating with the cavities C3 and C4, and which are fitted with the corresponding closing pins 34 and 35 so that the third and fourth cavities C3 and C4 may be closed.

A hydraulic cylinder 39 is disposed between the upper surface of the upper die 9 and the mounting plate 36 and operates to move the mounting plate 36 upwardly or downwardly, thereby causing the individual closing pins 34 and 35 to close the corresponding smaller diameter portions 32*a* and 33*a*. A rod 40 guides the mounting plate 36.

An expanding mechanism 41 is provided in the upper die 9 for applying an expansion force to each sleeve 3 in each of the cylinder barrels $\mathbf{1_1}$ and $\mathbf{1_4}$. The expanding mechanism $\mathbf{4_1}$ is constituted in the following manner.

A through hole 42 is made in the upper die 9 with its center line aligned with the axis of the operating pin 30, and a support rod 43 is loosely inserted in the through hole 42. The support rod 43 is fixed at its upper end to a bracket 44 on the upper surface of the upper die 9, and has as a sealing member a blocking plate 45 secured at its lower end for blocking the entry of molten metal. The blocking plate 45 is formed on its lower surface with a projection 45*a* which is fittable in the recess 23 at the top of the first molding portion $\mathbf{18_1}$.

Figure 10:
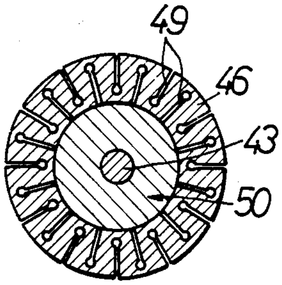
FIG. 10 is a sectional view taken along line X—X in FIG. 6.

A hollow expansion shell 46 has a circular outer peripheral surface and a tapered hole 47 which widens downwardly from the upper end toward the lower end. The lower portion of the support rod 43, projecting downwardly from the upper die 9, is loosely inserted into the tapered hole 47 of the expansion shell 46 whose upper end surface bears against a projection 48 extending as a sealing member on the recess 12 of the upper die 9 and whose lower end is carried on the blocking plate 45. As shown in FIG. 10, a plurality of slit grooves 49 are made in the peripheral wall of the expansion shell 46 at circumferentially uniform intervals to radially extend alternately from the inner and the outer peripheral surfaces of the expansion shell 46.

A hollow operating or actuating rod 50 is slidably fitted on the support rod 43 substantially over its entire length for expanding the expansion shell 46, and is comprised of a frustoconical portion 50*a* adapted to be fitted in the tapered hole 47 of the expansion shell 46, and a truly circular portion 50*b* continuously connected to the frustoconical portion 50*a* so as to be slidably fitted in the through hole 42 and to protrude from the upper die 9. A plurality of pins 57 protrude from the frustoconical portion 50*a* and each pin is inserted into a vertically elongated pin hole 58 of the expansion shell 46 to prevent the expansion shell 46 from being rotated while permitting vertical movement of the frustoconical portion 50*a*.

A hydraulic cylinder 51 is fixedly mounted on the upper surface of the upper die 9 and contains a hollow piston 52 therein. Hollow piston rods $\mathbf{53_1}$ and $\mathbf{53_2}$ are mounted on the upper and lower end surface of the hollow piston 52 and project therefrom into the upper and lower end walls of a cylinder body 4, respectively. The truly circular portion 50*b* of the operating rod 50 is inserted into a through hole in the hollow piston 52 and the hollow piston rods $\mathbf{53_1}$ and $\mathbf{53_2}$, and antiship stoppers $\mathbf{56_1}$ and $\mathbf{56_2}$ are each fitted in an annular groove of the truly circular portion 50*b* to bear against the upper end surface of the hollow piston rod $\mathbf{53_1}$ and the lower end surface of the hollow piston rod $\mathbf{53_2}$, respectively, so that the hollow piston 52 causes the operating rod 50 to be moved up or down. The four expanding mechanisms 41 correspond to the individual cylinder barrels $\mathbf{1_1}$ and $\mathbf{1_4}$ of the cylinder block S, respectively.

Figure 11:
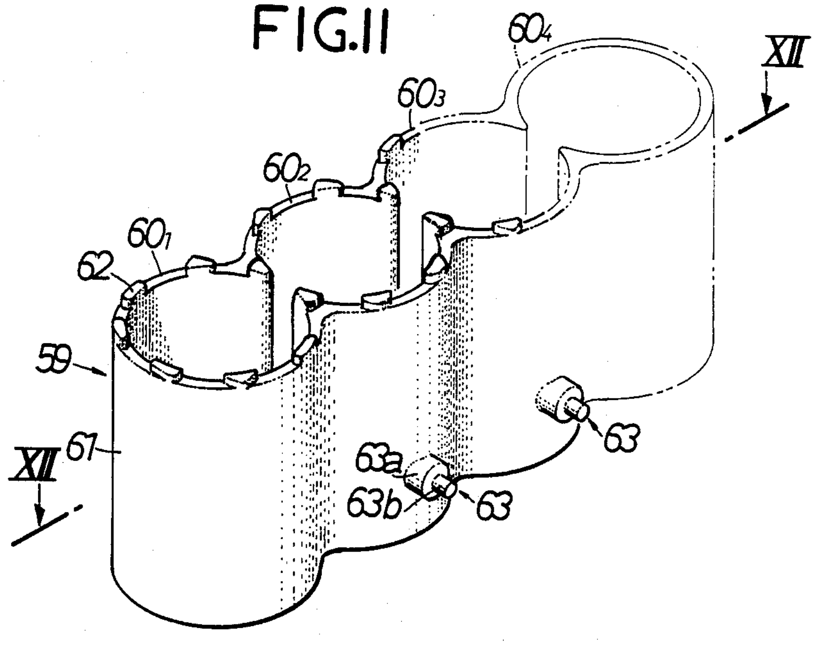
FIG. 11 is a perspective view of a sand core viewed from above.
Figure 12:
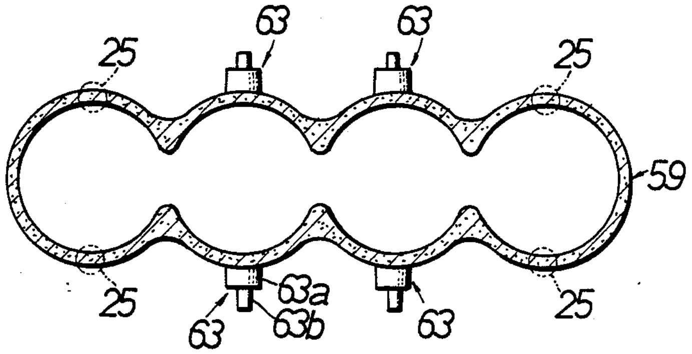
FIG. 12 is a sectional view taken along line XII—XII in FIG. 11.

FIGS. 11 and 12 show the water-jacket molding sand core 59 which is constituted of a core body 61 comprising four cylindrical portions $\mathbf{60_1}$ and $\mathbf{60_4}$ corresponding to the four cylinder barrels $\mathbf{1_1}$ and $\mathbf{1_4}$ of the cylinder block S with the peripheral interconnecting walls of the adjacent cylindrical portions being eliminated, a plurality of projections 62 formed on the end surface of the core body 61 on the cylinder head side to define the communication ports 7 for permitting communication between the water jackets 6 and the water jackets of the cylinder head, and a core print 63 protruding laterally on opposite outer side surfaces of the core body 61, e.g., on the opposite outer side surfaces of two cylindrical portions $\mathbf{60_2}$ and $\mathbf{60_3}$ located between the outermost cylindrical portions in the illustrated embodiment. Each of the core prints 63 has a larger diameter portion 63*a* integral with the core body 61, and a smaller diameter portion 63*b* on the end surface of the larger diameter portion 63*a*. In this case, the projection 62 is dimensioned to be loosely fitted in the aforesaid fourth cavity C4.

Description will now be made of the operation of casting a cylinder block blank Sm in the above casting apparatus.

First, as shown in FIG. 6, the upper die 9 is moved upwardly and both the side dies $\mathbf{10_1}$ and $\mathbf{10_2}$ are moved away from each other, thus achieving opening of the mold. In the expanding mechanism 41, each hydraulic cylinder 51 is operated to cause the hollow piston 52 to move the operating rod 50 downwardly, so that the downward movement of the frustoconical portion 50*a* allows the expansion shell 46 to be contracted. In addition, the hydraulic cylinder 39 of the upper die 9 is operated to move the mounting plate 36 upwardly. This causes the individual closing pins 34 and 35 to be released from the corresponding smaller diameter portions 32*a* and 33*a* respectively communicating with the third and fourth cavities C3 and C4. Further, the plunger 16 in the cylinder 15 is moved downwardly.

The substantially circular sleeve 3 of cast iron is loosely fitted on each expansion shell 46, and the opening at the upper end of the sleeve 3 is fitted and closed by the projection 48 of the upper die 9. The end surface of the sleeve 3 is aligned with the lower end surface of the projection 45*a* on the blocking plate 45, while the opening at the lower end of the sleeve 3 is closed by the blocking plate 45. The hydraulic cylinder 51 of the expanding mechanism 41 is operated to cause the hollow piston 52 therein to lift the operating rod 50. The frustoconical portion 50*a* is thereby moved upwardly, so that the expansion shell 46 is expanded. Thereupon, the sleeve 3 is subjected to an expansion force and thus reliably held on the expansion shell 46.

As shown in FIGS. 6 and 12, the lower edges of the cylindrical portions $60_1$ and $60_4$ on the outermost opposite sides of the sand core 59 are each engaged in the recess 25*a* of each pin 25 projecting from the top of each of the first molding portions $18_1$ on the opposite sides in the lower die 11, thereby temporarily positioning the sand core 59.

The side dies $10_1$ and $10_2$ are moved a predetermined distance toward each other to engage each core bedding recess 31 with each core print 63, thus finally positioning the sand core 59. More specifically, the smaller diameter portion 63*b* of each of the core prints 63 in the sand core 59 is fitted into the engaging hole 31*a* of each of the core-bedding recesses 31 to position the sane core 59, with the end surface of each of the larger diameter portions 63*a* parallel to the direction of the cylinder barrels being mated with the clamping surface 31*b* of each core bedding recess 31 to clamp the sand core 59 by the clamping surface 31*b*.

As shown in FIG. 7, the upper die 9 is moved downwardly to insert each of the sleeves 3 into each of the cylindrical portions $60_1$ to $60_4$ of the sand core 59, and the projection 45*a* of the blocking plate 45 is fitted into the recess 23 at the top of the first molding portion $18_1$. This causes the projection 45*a* of the blocking plate 45 to push the operating rod 30 down, so that each of the pins 25 is moved down and retracted from the top surface of the first molding portion $18_1$. In addition, the clamping recesses 12 of the upper die 9 are fitted with the clamping projections 13 of both the side dies $10_1$ and $10_2$, thus effecting the closing of mold. This downward movement of the upper die 9 causes the projection 62 of the sand core 59 to be loosely inserted into the fourth cavity c4, whereby a space is defined around the projection 62. A space 70 for shaping the reinforcing deck portion 8 is also defined between the end surface of the sand core 59 and the inner surface of the recess 12 opposed to such end surface.

A molten metal of aluminum alloy is supplied from the furnace to the basin 14 of the lower die 11, and the plunger 16 is moved up to inject the molten metal through both the runners 17 and into the second cavities C2 and the first cavities C2 via the gates 19. The use of this bottom introduction process allows a gas, such as air, in both the cavities C1 and C2 to be forced up by the molten metal and vented upwardly from the upper die 9 via the gas vent holes 32 and 33 in communication with the third and fourth cavities C3 and C4.

As both runners 17 have stepped bottom surfaces from the basin 14, the sectional area decreases stepwise toward the runner extensions 17*a* and hence, the upward movement of the pluner 16 causes the molten metal to be passed from both runners 17 through the gates 19 and to smoothly rise in the second cavities C2 substantially uniformly over the entire length thereof from the opposite side lower ends thereof. Thus, the molten metal does not produce turbulent flow in the cavities C1 and C2, and a gas, such as air, is prevented from being included into the molten metal to avoid the generation of any mold cavities.

After the molten metal has been introduced in the third and fourth cavities C3 and C4, the hydraulic cylinder 39 on the upper die 9 is operated to move the mounting plate downwardly, thereby causing the closing pins 34 and 35 to close the smaller diameter portions 32*a* and 33*a* communicating with the cavities C3 and C4, respectively.

Figure 13:
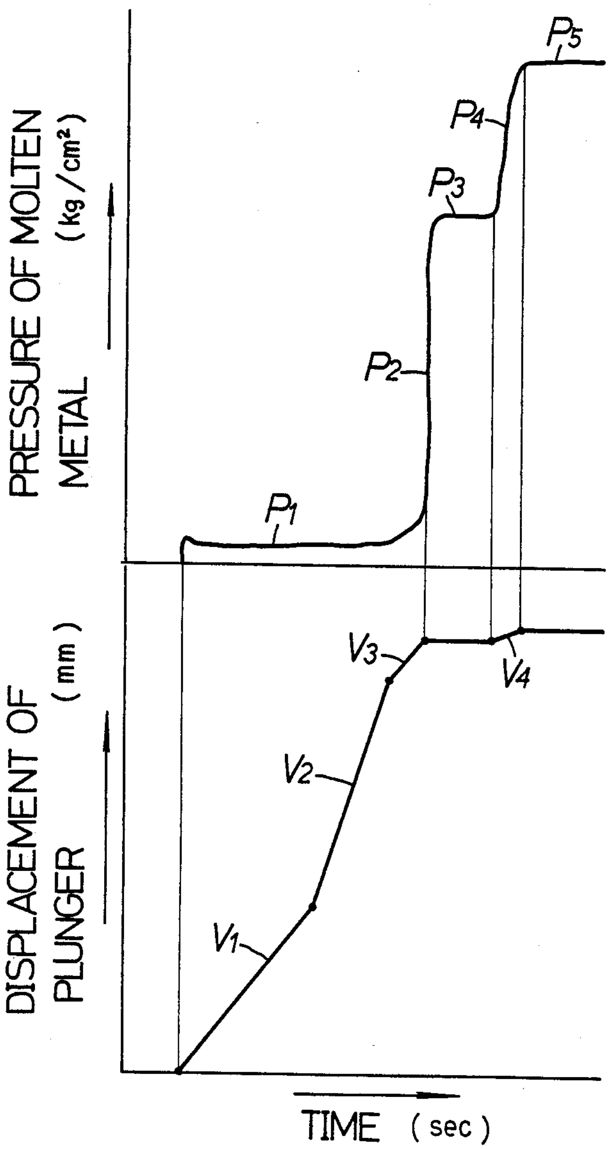
FIG. 13 is a graph representing the relationship between time and displacement of a plunger and the relationship between time and pressure of molten metal.

In the above operation of introduction of molten metal, the displacement of the plunger 16 for injecting the molten metal into the second and first cavities C2 and C1 and the pressure of the molten metal are controlled as shown in FIG. 13.

More specifically, the speed of plunger 16 is controlled in three stages of first to third velocities V1 to V3. In the present embodiment, the first velocity V1 is set at 0.08–0.12 m/sec., the second velocity V2 is at 0.14–0.18 m/sec., and the third velocity V3 is at 0.04–0.08 m/sec. to give a substantial deceleration. This control in velocity at three stages prevents the production of waves in the molten metal and achieves a calm molten metal flow which will not include a gas, such as air, thereinto, so that the molten metal can be injected into both the cavities C2 and C1 with good efficiency.

At the first velocity V1 of the plunger 16, the molten metal merely fills both the runners 17 and hence, the pressure P1 of the molten metal is kept substantially constant. At the second and third velocities V2 and V3 of the plunger 16, the molten metal is injected into both the cavities C1 and C2 and therefore, the pressure P2 of the molten metal rapidly increases. After the plunger 16 has been moved at the third velocity V3 for a predetermined period of time, the pressure P3 of the molten metal is maintained at 150–400 kg/cm$^2$ for a period of about 1.5 seconds, whereby the sand core 59 is completely enveloped in the molten metal whereby a solidified film of molten metal is formed on the surface thereof.

After the above time has elapsed, the plunger 16 is deceleratively moved at the velocity V4, so that the pressure P4 of the molten metal increases. When the pressure has reached a level P5 of 200–600 kg/cm$^2$, the movement of the plunger 16 is stopped, and under this condition, the molten metal is solidified.

If the pressure of the molten metal is kept constant for a predetermined period of time to form the solidified film of molten metal on the surface of the sane core 59 as described above, the sand core 59 is protected by the film against breaking. In addition, the sand core 59 is expanded due to the molten metal, but because the projection 62 is loosely inserted in the fourth cavity C4, it follows the expansion of the sand core 59, whereby folding of the projection 62 is avoided.

Since the sand core 59 is clamped in an accurate position by both the side dies $10_1$ and $10_2$ through each of the core prints 63, it can not float up during introduction of the molten metal into the first cavities C1 and during pressing of the molten metal in the cavities C1. In addition, since the end surface of the larger diameter portion 63*a* of each core print 63 mates with the clamping surface 31*b*, as the sand core 59 is being expanded, the deforming force thereof is suppressed by each of the clamping surfaces 31*b*, to prevent deformation of the sand core 59. Thus, the siamese type cylinder barrel 1 is produced with a uniform thickness around each of the sleeves 3.

As discussed above, a closed deck-type cylinder block blank can be cast with substantially the same production efficiency as in a die casting process, by controlling the speed of plunger 16 and the pressure of the molten metal.

After the completion of solidification of the molten metal, the hydraulic cylinder 51 of the expanding mechanism 41 is operated to move the operating rod 50 downwardly, thereby eliminating the expansion force of the expansion shell 46 on the sleeve 3. The mold is opened to yield a cylinder block blank Sm as shown in FIG. 5.

Figure 14A:
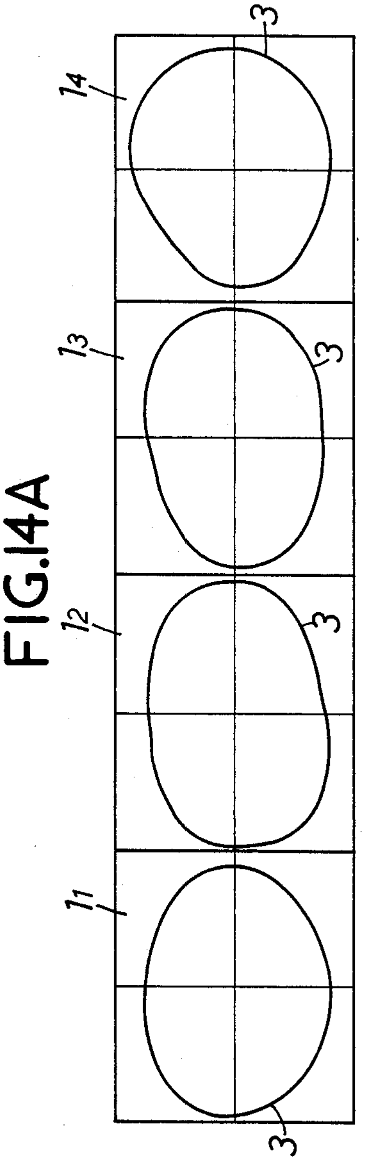
FIGS. 14A and 14B are a measurement diagram illustrating the results of Tallyrond measurements for the configurations in inner diameter of the sleeves of the siamese-type cylinder block blank obtained from the casting process according to the present invention and the sleeves in a comparative example, respectively.

In the cylinder block blank Sm, as shown in FIG. 14A illustrating the result of a Tallyrond measurement (100 times), the section of each sleeve 3 has a substantially oval configuration with its longer axis parallel to the direction of cylinder barrels $\mathbf{1}_1$ to $\mathbf{1}_4$, which corresponds to the configuration in section of each of the cylinder barrels $\mathbf{1}_1$ to $\mathbf{1}_4$ after solidification shrinkage.

The reason why such a result is obtained is that the expansion force is applied to each sleeve 3 by the expanding mechanism 41 during introducing of the molten metal so that each sleeve 3 is prevented from being deformed by the pressure of the molten metal and that the expansion force on each sleeve 3 is eliminated after the solidification of the molten metal is completed, whereby each sleeve 3 is subjected to a solidification shrinking force and is deformed in such a manner to follow the configuration in section of each of the cylinder barrels $\mathbf{1}_1$ to $\mathbf{1}_4$.

Thereupon, the casting stress remaining in each sleeve 3 is distributed substantially uniformly over the entire periphery thereof.

Figure 14B:
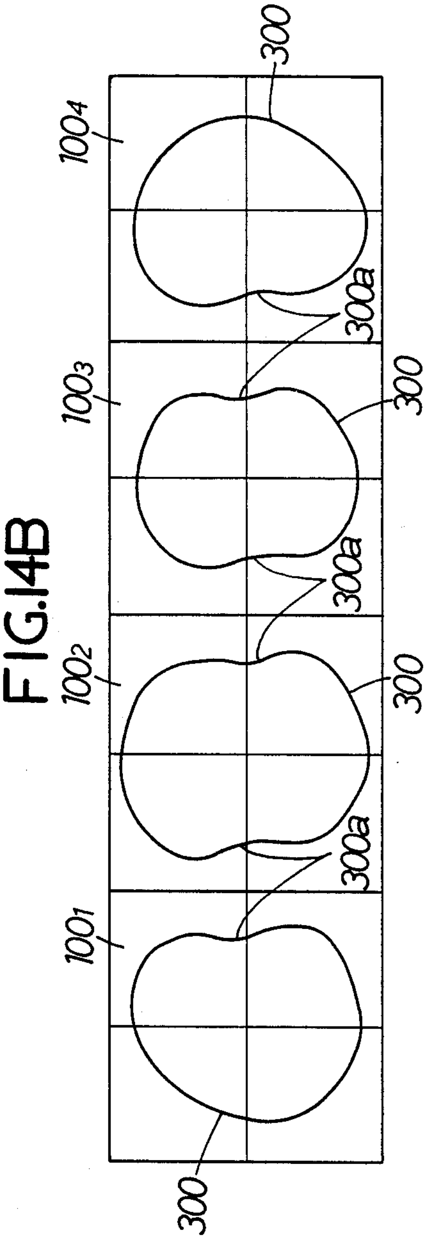

FIGS. 14B illustrates the results of a Tallyrond measurement for a siamese-type cylinder block blank given as a comparative example by casting truly circular sleeves 300 into cylinder barrels $\mathbf{100}_1$ to $\mathbf{100}_4$ without employing the expanding mechanism 41. As apparent from this Figure, the configuration in section of each sleeve 300 presents an ellipse having its longitudinal axis perpendicular to the direction of alignment of the cylinder barrels and particularly, between the connection of adjacent cylinder barrels. Furthermore, because the opposed peripheral walls of the sleeves are being subjected to the injection pressure of the molten metal, concave portions 300*a*, respectively are formed.

Figure 15A:
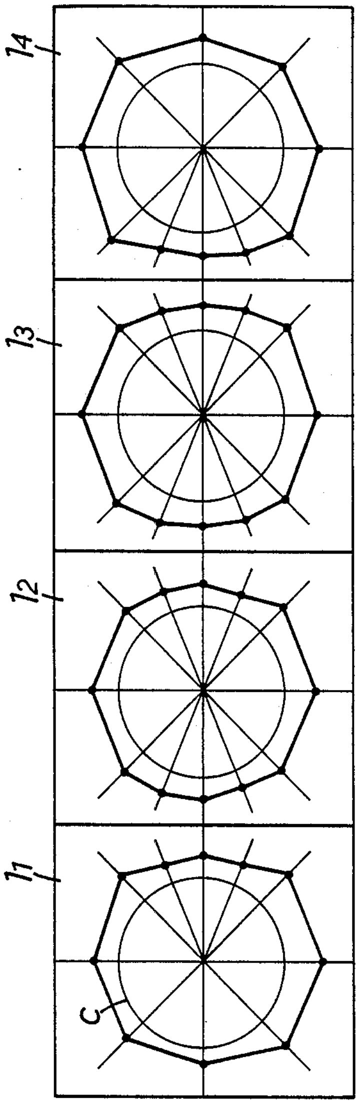
FIGS. 15A and 15B are diagrams illustrating the degree of balance in casting stress remaining in the sleeve of the siamese-type cylinder block blank obtained from the casting process according to the present invention and the sleeve in the comparative example, respectively.

FIG. 15A illustrates the casting stress remaining in each sleeve 3 of a cylinder block blank Sm according to the present invention, and in this Figure, the true circle c represents a zero point of casting stress. It is apparent from this Figure that a good degree of balance in casting stress is obtained over the entire periphery of each sleeve 3 in the above blank Sm.

Figure 15B:
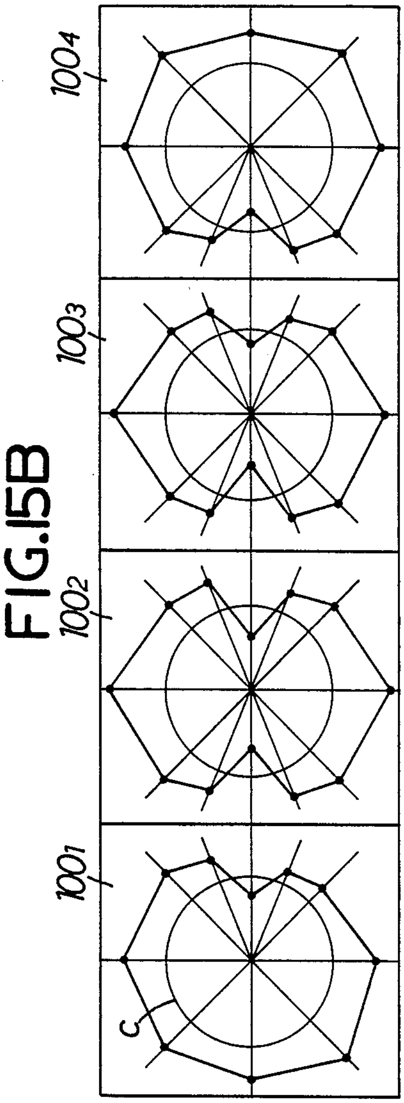

FIG. 15B illustrates the casting stress remaining in each sleeve 300 in the above comparative example, and in this case, the adjacent cylinder barrels are specifically different from each other, resulting in an inferior degree of balance in the casting stress.

The protruding portions 64 (FIG. 5) of each enveloping projection 62 of the sand core 59 are removed from the cylinder block blank Sm, whereby the communication holes 7 and the reinforcing deck 8 between adjacent communication holes 7 are formed. Thereafter, the removal of the sand core provides water jackets 6. Then, the inner peripheral surface of each sleeve 3 is subjected to a working operation to form a true circle. Further, another predetermined working operation is also effected to produce the cylinder block S as shown in FIG. 1 to 4.

The cylinder block blank in the comparative example is also subjected to similar working operations to produce a cylinder block.

Figure 16B:
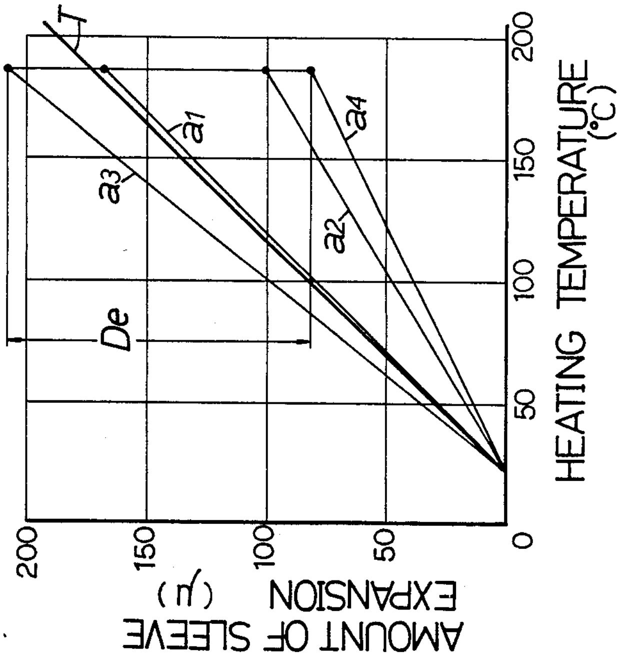
FIGS. 16A and 16B are graphs illustrating the relationship of the amount of sleeve expansion at the heating temperature for the sleeve of the siamese-type cylinder block according to the present invention and the sleeve in the comparative example, respectively.
Figure 16A:
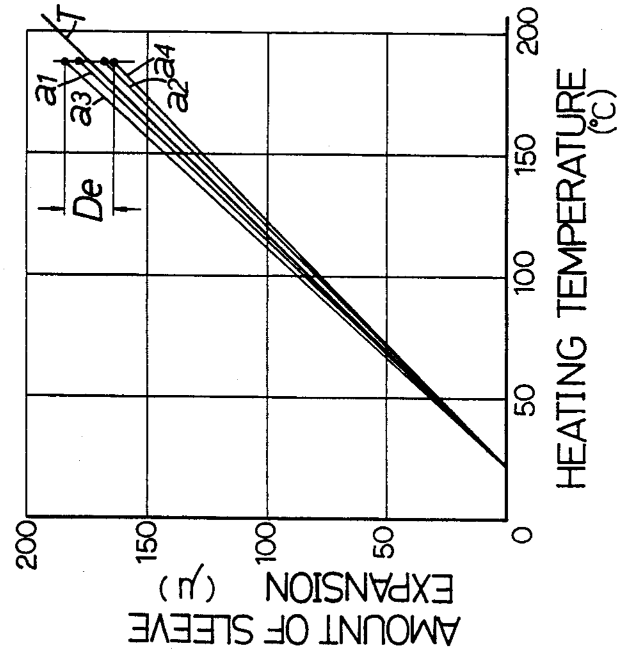
Figure 17:
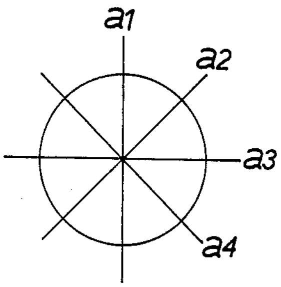
FIG. 17 is a diagram illustrating the position of measuring the amount of sleeve expansion.

FIGS. 16A and 16B illustrate the variation in inner diameter in terms of the amount of sleeve expansion for both the sleeves 3 and 300 in the case where both the cylinder blocks are uniformly heated, respectively. The determination of the expansion was effected by determining the variation in inner diameter at four points a1 to a4 on the circumference, as shown in FIG. 17.

FIG. 16*a* illustrates such variation for the cylinder block S obtained according to the present invention. In this case, the difference De between the maximum and minimum expansion at a temperature of about 190°, at which the cylinder block will be heated during the operation of an engine, is as small as 20$\mu$, and the expansion at the individual points a1 to a4 are closely distributed. Moreover, the expansions approximate a theoretical magnitude of expansion T. This may be attributable to the good degree of balance in the casting stress remaining in each sleeve 3 as described above.

FIG. 16B illustrates such variation in the inner diameter for the cylinder block obtained in the comparative example. In this case, the difference De between the maximum and minimum expansions at the same temperature is as large as 128$\mu$, and the expansion of the individual points a1 to a4 are found to vary widely. Moreover, the expansion at three points a2, a3 and a4 depart significantly from the theoretical expansion T. This may be caused by the inerior degree of balance in the casting stress remaining in each of the sleeves 300 as mentioned above.

In the cylinder block blank SM according to the present invention, the configuration in section of each sleeve after casting exhibits a substantially oval shape and the casting stress remaining in each sleeve is distributed substantially uniformly over the entire circumference of the sleeve due to the good degree of balance in the casting stress. Therefore, if the inner peripheral surface of each sleeve of the cylinder block blank Sm is machined to a true circle, the thermal expansion of each sleeve around its circumference in the resulting cylinder block is substantially uniform during the operation of the engine. Thereby, any clearance between a piston ring and the sleeve can be minimized, thus making it possible to overcome problems of increase in quantity of blow-by gas, and useless consumption of oil or the like.

In the process for casting the siamese-type cylinder block blank Sm as described above, if each sleeve is previously heated to a temperature of 150° to 700° C., it is possible to heat each sleeve by the molten metal substantially to the same temperature as the molten metal to reduce the rigidity thereof. After the solidification of the molten metal is completed, the expansion force on each sleeve is eliminated, so that each sleeve having a rigidity thus reduced is deformed in a manner to follow the sectional configuration of the cylinder barrel during the shrinkage of the latter. Thus, each sleeve is formed with a substantially oval shape cross section and with a longitudinal axis parallel to the cylinder barrels, and the casting stress remaining in each sleeve is substantially uniform around the circumference of the sleeve resulting in a good degree of balance in such stress.

In this case, the thickness t1 of each sleeve 3 is set at a value which is 50% or more of the smallest thickness of the cylinder barrels $1_1$ to $1_4$ between the adjacent sleeves 3, i.e., the thickness t2 in the line interconnecting the centers of the adjacent sleeves 3. In this embodiment, with the thickness t2 of the thinnest portion being 4.5 mm, the thickness of each sleeve is set at 3 mm or more.

The examples of processes for casting such cylinder block blank include a process comprising previously heating a sleeve of cast iron having a thickness of 5 mm to a temperature of 250° to 400° C. to conduct a casting operation as described above, and subjecting the inner peripheral surface of the sleeve in the blank to a working operation to form the surface as a true circle with a finished thickness of 3 mm, thus providing a siamese-type cylinder block.

In the process for producing the above siamese-type cylinder block, the thickness of each sleeve at a value of 50% or more of the smallest thickness of t2 of cylinder barrels between the adjacent sleeves, each of the sleeves will be deformed to follow the sectional configuration of each of the cylinder barrels during the shrinkage thereof because of the reduced rigidity of the sleeves and will have a substantially oval configuration in section with its longer axis parallel to the direction of alignment of the cylinder barrels. For example, if the smallest thickness t2 of cylinder barrels $1_1$ to 4 is 6 mm, then the thickness t1 of each sleeve is 2 mm.

Examples of processes for making such a cylinder block include a process comprising conducting the same casting operation as described above using a sleeve of cast iron having a thickness of 3 mm and then subjecting the inner peripheral surface of the sleeve in such blank to a working operation to form a true circle with a finished sleeve thickness of 2 mm.

Figure 18:
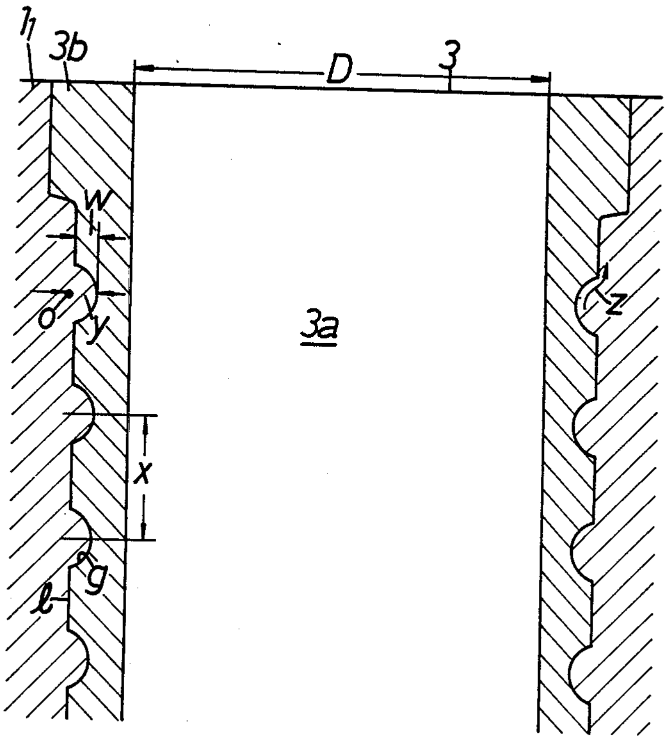
FIG. 18 is a sectional view showing the closely adhered portions between the sleeve and the cylinder barrel on an enlarged scale.

FIG. 18 illustrates the adhered portion between the sleeve 3 of cast iron and the cylinder barrel $1_1$ (or any cylinder barrel $1_2$ to $1_4$). In this case, the outer peripheral surface of the sleeve 3 is provided with annular slip-preventing grooves g are made in the outer periphery at a predetermined pitch by a mechanical operation to form a plurality of conjugate arcs in cross section at least over a predetermined length from the end at which a cylinder head is attached and in the illustrated embodiment, over the entire length therefrom.

Each of the slip-preventing grooves g is dimensioned such that with the inner diameter of the sleeve 3 represented by D, the depth of groove w=0.002D to 0.02D, the pitch between grooves x=0.01D to 0.10D, and the radius of groove y6=0.002D to 0.04D. The reference character 0 designates a center of groove radius 6.

The dimensions of each groove g are limited as follows: if the depth of groove w is below 0.002D, the anchoring effect of each slip-preventing groove g is reduced so that each sleeve 3 may easily slip from the corresponding one of the cylinder barrels $1_1$ to $1_4$, while if such depth exceeds 0.02D, entry of molten metal into each of the slip-preventing grooves g is difficult and a clearance may be produced between the inner surface of each of the grooves and each of the cylinder barrels $1_1$ to $1_4$. In addition, if the pitch x between grooves is less than 0.01D, the sleeve 3 is reduced in circumferential rigidity, on the one hand, and if the pitch exceeds 0.10D, a surface area enlarging effect of each groove g is decreased so that the heat releasing property of the sleeve 3 is hindered, on the other hand. Further, if the radius y of each groove is less than 0.002D, entry of molten metal into each slip-preventing groove g is difficult so that a clearance may be produced between the inner surface of each groove and each of the cylinder barrels $1_1$ to $1_4$, while with a radius above 10.04D, the pitch between grooves is increased thereby decreasing the number of grooves g and the surface area enlarging effect of the grooves g is decreased so that the heat releasing property of the sleeve is hindered.

By a preliminary mechaning of the entire outer periphery of the sleeve, good close adhesion between the sleeve and the molten metal will be obtained so that not even very small clearances will be produced between the sleeve and the cylinder barrel and consequently, release of heat from the sleeve will be conducted uniformly around its circumference. In addition, since the slip-preventing grooves cause the sleeve to be enlarged in surface area, the efficiency of release of heat from the sleeve will be improved conjointly with the aforesaid good close adhesion. Moreover, the thickness of the sleeve is uniform at the slippreventing groove and the land portion. Further, the slippreventing groove g in each of the sleeve 3 is formed as a conjugate arc and therefore, when molten metal is injected into the siamese-type cylinder barrel molding cavity Ca, the gas in the slip-preventing groove g is forced up by the molten metal to flow smoothly along the circularly arcuate inner surface as shown by the arrow z in FIG. 18 and be reliably discharged outside the grooves. As a result, gas can not be confined in the slip-preventing grooves g, leading to a good close adhesion between the sleeve and the molten metal.

Since each of the slip-preventing grooves g is formed by a machining operation, the accuracy in dimension thereof is satisfactory, leading to a uniform thickness of the sleeve 3 at the slip-preventing groove g and the land portion 1. If each slip-preventing groove g were to be shaped by the mold, the depths thereof would be distributed in a range up to about 1.0 mm. Also, if the groove g is formed as a superior arc of U-shaped in cross section, gas is apt to be trapped in the groove g.

In a siamese-type cylinder block made with sleeves 3 as described above, the amount of expansion of each sleeve 3 is substantially uniform around its circumference during the operation of the engine.

The good close adhesion between the sleeve 3 and the molten metal has been observed from a microphotograph of the metal. The slip-preventing groove g of each sleeve 3 is not limited to an annular type, and may be spiral. Moreover, the groove g need not always be provided over the entire length of the sleeve 3, and may be provided in a region from the cylinder head end of the sleeve to the portion of the sleeve opposite the piston oil ring at a bottom dead point.

Figure 19:
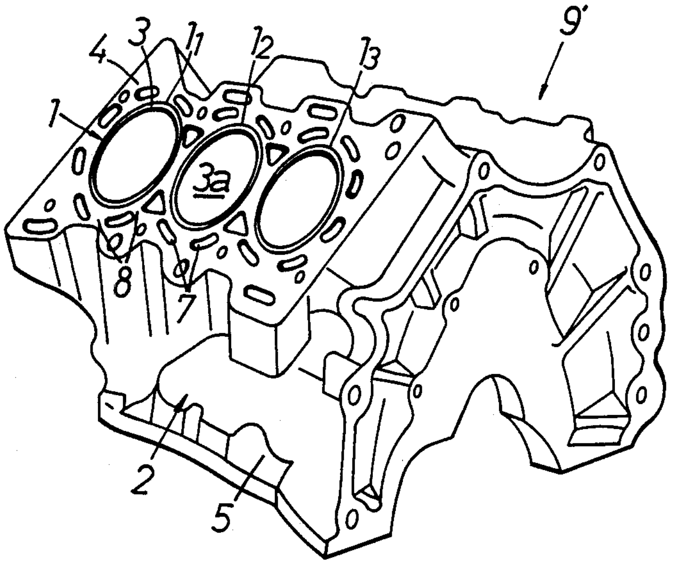
FIG. 19 is a perspective view of a V-shaped siamese-type cylinder block from above.

FIG. 19 illustrates a V-shaped siamese-type cylinder block S′ including two siamese-type cylinder barrels 1. The cylinder block S′ is also made by the same casting and machining processes as described above. In FIG. 19, the same reference characters are used to designate the same parts in the cylinder block S′ as in FIG. 1.

What is claimed is:

1. A method for manufacturing a siamese-type cylinder block in which sleeves of cast iron are respectively incorporated in a plurality of cylinder barrels of a siamese-type cylinder block made of an aluminum alloy, said cylinder barrels being disposed adjacent to each other and connected in series, said method comprising the steps of:

placing sleeve of cast iron adjacent to one another in a siamese-type cylinder barrel molding cavity, inserting mechanical expansion elements into the thus placed sleeves in a retracted condition, applying hydraulic pressure to the expansion elements to expand the expansion elements to produce an expansion force in said sleeves after the mold is closed, casting a cylinder block blank by pouring, under pressure, a molten metal of aluminum alloy into said siamese-type cylinder barrel molding cavity while maintaining the expansion force applied to said sleeves by said hydraulic pressure, and after completion of solidification of said molten metal, removing the hydraulic pressure to remove said expansion force to allow said sleeves to be deformed while following the configuration in section of the cylinder barrels during shrinkage thereof; and subjecting said blank to a working operation in which inner peripheral surfaces of said sleeves are brought into the form of a true circle.

2. A method for manufacturing a siamese-type cylinder block according to claim 1, wherein said cylinder block is of an in-line type.

3. A method for manufacturing a siamese-type cylinder block according to claim 1, wherein said cylinder block is V-shaped.

4. A method for manufacturing a siamese-type cylinder block according to claim 1, 2 or 3, wherein the pouring of said molten metal into said cavity is conducted utilizing a bottom pouring process.

5. A method for manufacturing a siamese-type cylinder block according to claim 1, 2 or 3, wherein the outer periphery of each said sleeve has the casting surface removed therefrom, and annular slip-off preventing grooves are made at a predetermined pitch in said outer peripheral surface in the circumferential direction over a predetermined length from the cylinder head-bound end of said sleeve.

6. A method for manufacturing a siamese-type cylinder block according to claim 5, wherein said slip-off preventing groove is formed as a conjugated arc in cross section.

7. A method for manufacturing a siamese-type cylinder block according to claim 6, wherein said slip-off preventing groove is sized such that with the inner diameter of said sleeve represented by D, the depth is set at 0.002D–0.02D, the pitch is set at 0.01D–0.10D and the radius is at 0.002D–0.04D.

8. A method for manufacturing a siamese-type cylinder block according to claim 1, 2 or 3, wherein the outer periphery of said sleeve has the casting surface removed therefrom, and spiral slip-off preventing grooves are made at a predetermined pitch in said outer peripheral surface in the circumferential direction over a predetermined length from the cylinder head-bound end of said sleeve.

9. A method for manufacturing a siamese-type cylinder block according to claim 1 wherein the hydraulic pressure is removed while the mold is still closed.

10. A method for manufacturing a siamese-type cylinder block according to claim 9 wherein after the hydraulic pressure is removed, the expansion elements remain the sleeves in the closed mold.

11. A method for manufacturing a siamese-type cylinder block according to claim 1 comprising heating said sleeves which are placed in said cavity to a temperature of 150° to 700° C. before the molten metal is cast in the mold.

12. A method for manufacturing a siamese-type cylinder block according to claim 11, wherein said cylinder block is of an in-line type.

13. A method for manufacturing a siamese-type cylinder block according to claim 11, wherein said cylinder block is V-shaped.

14. A method for manufacturing a siamese-type cylinder block according to claim 11, 12 or 13, wherein the pouring of said molten metal into said cavity is conducted utilizing a bottom pouring process.

15. A method for manufacturing a siamese-type cylinder block according to claim 11, 12 or 13, wherein the outer periphery of said sleeve has the casting surface removed therefrom, and annular slip-off preventing grooves are made at a predetermined pitch in said outer peripheral surface in the circumferential direction over a predetermined length from the cylinder head-bound end of said sleeve.

16. A method for manufacturing a siamese-type cylinder block according to claim 15, wherein said slip-off preventing groove is formed as a conjugated arc in cross section.

17. A method for manufacturing a siamese-type cylinder block according to claim 16, wherein said slip-off preventing groove is sized such that with the inner diameter of said sleeve represented by D, the depth is set at 0.002d–0.02D, the pitch is at 0.01D–0.10D and the radius is at 0.002D–0.04d.

18. A method for manufacturing a siamese-type cylinder block according to claim 11, 12 or 13, wherein the outer periphery of said sleeve has the casting surface removed therefrom, and spiral slip-off preventing grooves are made at a predetermined pitch in said outer peripheral surface in the circumferential direction over a predetermined length from the cylinder head-bound end of said sleeve.

19. A method for manufacturing a siamese-type cylinder block according to claim 1 is which the working operation on the inner surfaces of said sleeves reduces the thickness of the sleeves to 50% or less of the smallest thickness of the cylinder barrel between adjacent sleeves.

20. A method for manufacturing a siamese-type cylinder block according to claim 19, wherein said cylinder block is of an in-line type.

21. A method for manufacturing a siamese-type cylinder block according to claim 19, wherein said cylinder block is V-shaped.

22. A method for manufacturing a siamese-type cylinder block according to claim 19, 20 or 21, wherein the pouring of said molten metal into said cavity is conducted utilizing a bottom pouring process.

23. A method for manufacturing a siamese-type cylinder block according to claim 19, 20 or 21, wherein the outer periphery of said sleeve has the casting surface removed therefrom, and annular slip-off preventing grooves are made at a predetermined pitch in said outer peripheral surface in the circumferential direction over a predetermined length from the cylinder head-bound end of said sleeve.

24. A method for manufacturing a siamese-type cylinder block according to claim 19, 20 or 21, wherein the outer periphery of said sleeve has the casting surface removed therefrom, and spiral slip-off preventing grooves are made at a predetermined pitch in said outer peripheral surface in the circumferential direction over a predetermined length from the cylinder head-bound end of said sleeve.

25. A method for manufacturing a siamese-type cylinder block according to claim 23 or 24, wherein said slip-off preventing groove is formed as a conjugated arc in cross section.

26. A method for manufacturing a siamese-type cylinder block according to claim 25, wherein said slip-off preventing groove is sized such that with the inner diameter of said sleeve represented by D, the depth is set at 0.002D–0.02D, the pitch is at 0.01D–0.10D and the radius is at 0.002d–0.04D.

27. A method for manufacturing a siamese-type cylinder block according to claim 20 or 21, wherein said smallest thickness of said cylinder barrel is of 6 mm, and the thickness of said sleeve is of 2 mm.

28. An apparatus for casting a siamese-type cylinder block blank in which sleeves of cast iron are respectively incorporated in a plurality of cylinder barrels of a siamese-type cylinder barrel made of an aluminum alloy, said cylinder barrels being disposed adjacent to each other and connected in series, comprising:

means for supporting a plurality of sleeves in a mold cavity;

an expanding mechanism located at a portion of said cavity in which each of said sleeves is disposed, said mechanism including means for applying a mechanical expansion force to each said sleeve and for releasing said expansion force independently of a casting operation, the latter said means including a hydraulic cylinder for developing hydraulic pressure which acts during said casting operation to produce said mechanical expansion force on each said sleeve during the casting operation; and a pair of sealing members for sealing the inner peripheral surfaces of each sleeve at the opposite open ends thereof.

29. An apparatus for casting a siamese-type cylinder block blank according to claim 28, wherein said expanding mechanism includes an expansion shell inserted in said sleeve and an operating rod for expanding said expansion shell, said expansion shell having a tapered hole opened at its opposite ends, and a plurality of slit grooves made in its peripheral wall to radially extend alternately from the inner and outer peripheral surfaces, said operating rod having a frustoconical portion slidably fitted in said tapered hole.

30. An apparatus for casting a siamese-type cylinder block blank according to claim 29, comprising pin and slot means interconnecting said shell and operating rod for establishing end positions for travel of said rod in said shell between expanded and contracted positions for said shell.

31. An apparatus for casting a siamese-type cylinder block blank according to claim 28 comprising a mold including first and second mold members which are relatively movable between openable and closable positions in said cavity, said first mold member supporting said hydraulic cylinder and said sleeves.

32. An apparatus for casting a siamese-type cylinder block blank according to claim 31 wherein said second mold member supports core bodies into which the sleeves are inserted in closed position of the mold members.

33. An apparatus for casting a siamese-type cylinder block blank according to claim 31 wherein said expanding mechanism includes expanding elements coupled to said hydraulic cylinder and disposed within said sleeves to apply selective mechanical expansion force to the sleeves when the mold is closed.

* * * * *